Aug. 9, 1960   H. HALDEMANN ET AL   2,948,840
ELECTRO-MECHANICAL CURVE SENSING SYSTEM
Filed March 24, 1958   2 Sheets-Sheet 2
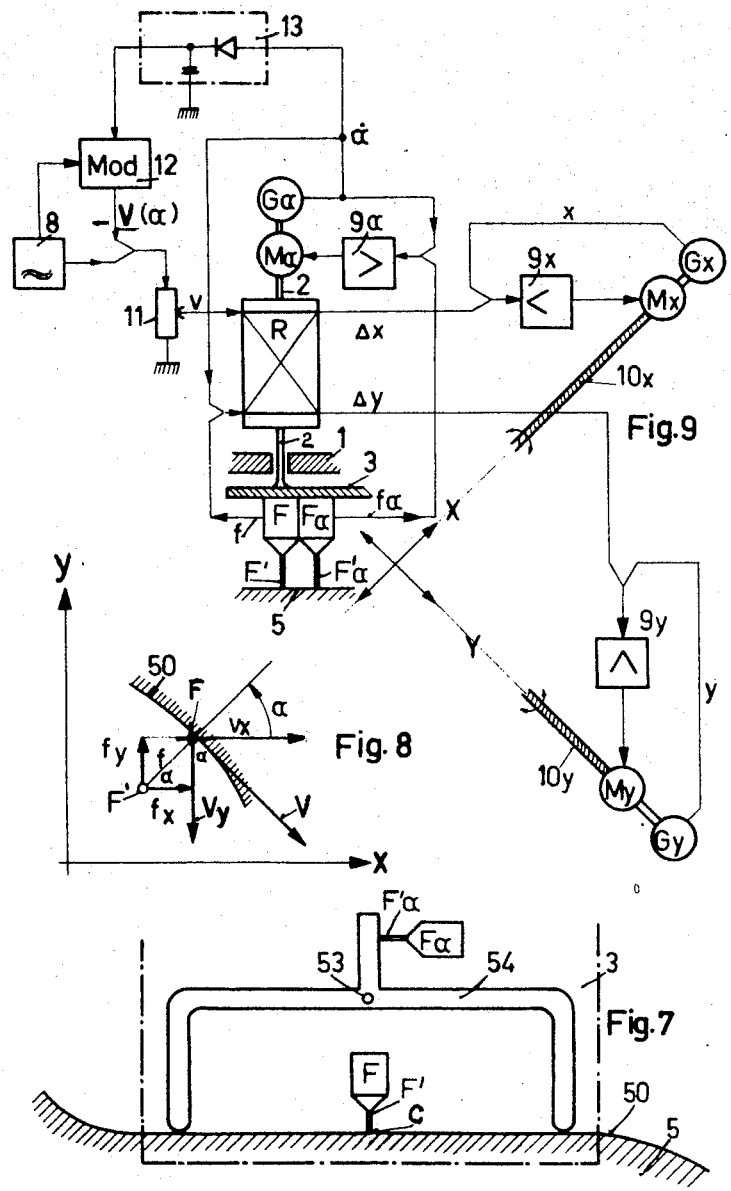

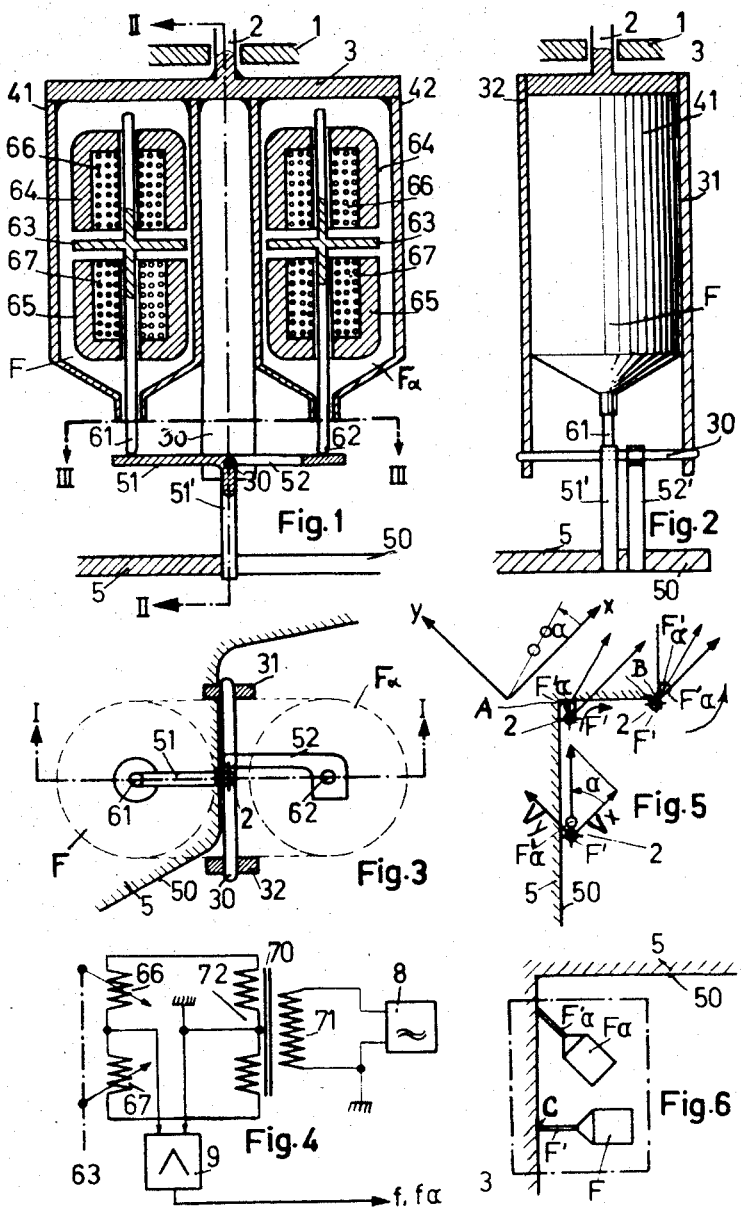

United States Patent Office 2,948,840
Patented Aug. 9, 1960

2,948,840

ELECTRO-MECHANICAL CURVE SENSING SYSTEM

Heinz Haldemann, Zurich, and Hansruedi Stutz, Oberengstringen Zh., Switzerland, assignors to Contraves, AG., Zurich, Switzerland Filed Mar. 24, 1958, Ser. No. 723,339

Claims priority, application Switzerland Mar. 27, 1957

8 Claims. (Cl. 318—29)

The present invention relates to an electro-mechanical curve sensing system, of the type comprising a feeler means with a sensing feeler, the carrier of which is moved in at least one direction under the action of a servo-motor drive system, the feeler means causing the generation of a corrective voltage for controlling the drive system when the sensing feeler is deflected from a mean position due to a deviation of the feeler means from the curve.

The main object of the invention is to improve such a sensing system to such an extent that it is possible to sense curves of any shape desired, even closed ones, and in principle without any follow-up error.

It is another object of the invention to provide a curve sensing system composed of comparatively few and simple elements, and thus constituting a rugged mechanism assuring accurate and reliable performance.

With these objects in view, the invention provides that the carrier of a feeler means assembly is movable by two servo-motor drive systems in two coordinate directions (X and Y), that it is also rotatable about an axis perpendicular to the X—Y plane passing at least approximately through the contact point of one sensing feeler with the curve, a corrective voltage $f$ being generated upon a deviation of the feeler means from the curve; the assembly includes a second feeler means, the sensing feeler of which contacts the curve adjacent the first sensing feeler, this second feeler upon changes of direction of the curve causing the generation of a second corrective voltage for controlling a rotary servo-motor system acting on a shaft, on which said assembly and a trigonometric computer are mounted, the latter being capable of translating an adjustable input voltage V determining the linear velocity of feed, and the corrective voltage $f$ of the first feeler means into the feed components $$\Delta y = f.\sin \alpha - V.\cos \alpha$$

and $$\Delta x = f.\cos \alpha + V.\sin \alpha$$

as a function of the angle $\alpha$ between the direction of the curve at a given point and the X-axis which feed components are fed as control voltages into the servo-motor drive units for the adjustment of the carrier in both coordinate directions.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 shows a sensing feeler arrangement in cross-sectional elevation, the section being taken along line I—I of Fig. 2;

Fig. 2 is an end view thereof, partly in section along line II—II of Fig. 1;

Fig. 3 is a plan view partly in section along the line III—III of Fig. 1;

Fig. 4 is a wiring diagram of a circuit used for generating a corrective voltage $f$ by the aid of a feeler means according to Figs. 1 to 3;

Fig. 5 illustrates diagrammatically various positions of sensing feelers according to Figs. 1 to 3 along a templet face;

Fig. 6 is a modification of Fig. 5;

Fig. 7 is a further modification of Fig. 5;

Fig. 8 shows a portion of a curve with a sensing feeler F in an X—Y-field, for deriving the equations determining the movement components of the sensing feeler; and Fig. 9 is a diagrammatic illustration of a complete curve sensing system according to the invention.

According to Figs. 1 to 3 a carriage plate 1, which is preferably designed as a cross head slide shiftable independently in two coordinate directions, rotatably supports a shaft 2 in a position perpendicular to the plane of the two directions of movement X, Y, which shaft is rotated by a rotational servo-motor system (not shown in Figs. 1–3).

The shaft 2 carries underneath the carriage plate 1 a feeler means carrier plate 3, which is attached to it for rotation therewith and on which two feeler housings 41, 42 are mounted. On two vertical legs 31, 32 fixed to the carrier plate 3 a supporting axle 30 is mounted extending transversely of the axis of the axle 2 and intersecting the same, and two L-shaped sensing feelers 51, 52 are pivotally mounted for turning movement about axle 30.

The two neighboring vertical legs 51', 52' of the angular sensing feelers 51, 52 are designed for contacting under spring bias a control (not shown) the edge face 50 of a templet 5 which templet is stationarily mounted in a position parallel to the X—Y plane in which the carriage plate 1 is movable. The opposite ends of the feelers 51, 52 are arranged to be able of displacing the adjuster pins 61, 62, respectively, of mechanical-inductive converters, known per se, located in the housings 41, 42, respectively. Each of these adjuster pins 61, 62 consisting of ferromagnetic material carries an annular flange 63 which is movable up and down as a movable armature between two ferro-magnetic cup shap armatures 64, 65, respectively. In each of the armature cups 64, 65, respectively, are arranged coils 66, 67, which according to Fig. 4 are connected to the secondary winding 72, tapped in the center, of a transformer 70, the primary winding 71 of which is connected to the output of an alternating current generator 8.

The circuit Fig. 4 applies identically to either one of the feeler arrangements 63—67, of which the arrangement in housing 41 is operated by pin 61 and feeler 51, 51', while the arrangement 63—67 in housing 42 is operated by pin 62 and feeler 52, 52'.

The inductances of the coils 66 and 67 of each converter together with the two halves of the winding 72 form a bridge, the output voltage of which is applied, as shown, to the amplifier 9.

When the armature plate 63 of any one of the converters is positioned equidistantly in the air gap between the armatures 64, 65, the inductances of the coils 66, 67 are equal to one another so that the bridge arrangement of Fig. 4 is in equilibrium and no voltage is supplied to the amplifier 9. When, however, under the action of a rotational movement of one of the sensing feelers 51, 52 one of the adjuster pins 61, 62 is displaced from the mean position illustrated, the inductance of one of the coils 66, 67 increases (reduction of its effective air gap), while the other of these inductances diminishes (corresponding increase of its effective air gap). Thereby the bridge arrangement according to Fig. 4 is thrown out of equilibrium and at the output of the bridge a corrective voltage appears, which is amplified to a corrective signal $f$ in the amplifier 9. It should be noted that in Figs. 1 to 3 the biasing springs for attaining the contact pressure of the sensing feelers 51, 52 against the templet face 50 are not illustrated for the sake of simplicity of the drawing. Moreover, it should be noted that electro-mechanical sensing feeler means are known as such in various modifications, e.g. as differential condensers, as potentiometers, or as so-called pick-offs, any of which could be inserted without difficulty into a bridge arrangement according to Fig. 4 instead of the coils 66, 67 described by way of example.

Hereinafter such feeler means, which may be of any kind whatever, will be referred to as a whole by F or Fα, respectively. They are always understood to comprise a shiftable or turnable sensing feeler F' or F'α, respectively, and an electrical differential transformer system operating substantially like the devices 63—67 described above.

The meaning of Fα and F'α will be described further below.

The sensing feelers 51, 52 are urged by biasing means toward a mean position as indicated in Figs. 1–3.

It is essential, however, that on a carrier 3 which is shiftable e.g. with a carriage plate 1 in two coordinate directions, two feeler means F, Fα having sensing feelers F', F'α are fixedly mounted, and that this common carrier plate 3 is rotatable about an axis (e.g. of shaft 2) which perpendicularly intersects the X—Y plane and passes approximately through the point of contact of one of the sensing feelers F', F'α with the curve face 50, the "sensed point."

In principle the carrier 3 is displaced relative to the templet 5 in such a manner that the sensing feeler F'α is moved ahead and the sensing feeler F' is moved so as to follow along the curve face 50, the tangential movements along the edge 50 being each composed of the two components $v_x = v.\cos \alpha$ and $v_y = -v.\sin \alpha$ in the X and Y direction, respectively, the angle between the velocity vector $v$ and the positive X-axis being denoted α. Provisionally it may be assumed, that these conditions are faultlessly kept as long as the control face 50 does not alter its direction in the X—Y-field as illustrated in the lower portion of Fig. 5.

In Fig. 5 also two typical changes of direction of the control face 50 are indicated at A and B. When the feeler system or rather the sensing feeler F'α arrives at such a turn it will follow this turn since it contacts the curve or templet edge under spring bias. Thereby in the associated metering system (Fig. 4) a corrective voltage fα is generated, which in a manner to be described later in more detail is fed as a corrective control voltage into a rotational servo-motor system for the carrier shaft 2 of the carrier 3. At this point it should only be noted, that under the action of this corrective voltage the carrier 3 with the sensing feelers F' and F'α performs a rotation about the axis of shaft 2 which results in a reduction of this corrective voltage fα until the feeler device is turned into the proper direction and further carried along the edge 50 (see Fig. 5).

The feeler means F also constantly follows accurately the templet face 50 since it contacts the same under spring bias, and generates upon any deviation a corrective control voltage f, which in a manner likewise to be described later is translated in dependence of the instantaneous value of the angle α at any given point into the correction components for the servo-motor drives in the X- or Y-direction.

In an arrangement according to the Figs. 1 to 3 and 5 it is necessary, that face portions of the templet edge enclosing re-entrant angles are connected by a round corner having a radius of curvature of a magnitude approximately commensurate with the distance between the centers of the two sensing feelers F' and F'α. This is not necessary, however, in the modification according to Fig. 6, wherein the feeler means F and F'α are positioned horizontally, i.e. with their sensing feelers F' and F'α respectively, operating axially substantially in the plane X—Y, and wherein the sensing feeler F'α is preferably arranged inclined at an angle of 45° to the sensing feeler F'. When now the feeler F'α abuts a re-entrant corner, it generates in the associated metering system a corrective voltage fα, which causes the feeler means to turn about an axis C located in the point of contact of the feeler means F.

As shown by Fig. 7, in a modification of the embodiment of Fig. 6, the sensing device carried by the carrier 3 has a second pivot 53 with an axis of rotation parallel to the axis C and a three-legged feeler member 54 turnable about pivot 53 and contacting with two legs the control face 50 on opposite sides of the sensing feeler F', while its third leg operates the sensing feeler F'α of the feeler means Fα. A system according to this modification permits the reversal of the direction of feed at will.

From Fig. 8 can be derived the computation of the necessary components of movements of a sensing feeler F', which is indicated as contacting in the X—Y field the templet face 50. However, if the sensing feeler F' is assumed to have deviated owing to a wrong movement of the carrier 3 from the correct contact position indicated in the drawing, a corrective voltage $f$ appears in the metering system associated with the sensing feeler F' (Fig. 4).

The corresponding X and Y components of the corrective voltage $f$ must have the values:

$$f_x = f.\cos \alpha$$

$$f_y = f.\sin \alpha$$

which have to be added to the feed voltage components of the input voltage V:

$$V_x = V \sin \alpha$$

$$V_y = V \cos \alpha$$

Therefrom result the values:

$$y = f \sin \alpha - V \cos \alpha$$

$$x = f \cos \alpha + V \sin \alpha$$

which constitute the control voltages for the servo-motor adjuster drives moving the carrier 3.

Under these assumptions a complete embodiment of a templet sensing device will be described hereinafter by way of example with reference to Fig. 9.

It is here assumed that the feeler means carrier 3 attached to the shaft 2 and rotatably journalled in the cross head slide 1 is movable in its two directions of movement X and Y (shown in the right hand portion of the diagram) so that the cross head slide 1 may be moved by a guide spindle 10x in the X-direction in another supporting slide (not shown), which other slide is slidable in a guide track in the Y-direction by means of a guide spindle 10y.

The guide spindles 10x and 10y and the rotatable shaft 2 of the feeler means carrier 3 each are associated and operatively connected with a tachometrically counter-coupled drive system with servo-motors Mx, My and Mα, respectively, mounted on the same shafts, as well as a control amplifier 9x, 9y and 9α, respectively.

On the shaft 2 there is moreover mounted a trigonometrical computer in the form of a "transformation eight-pole" R. One of the input voltages for the computer R is formed by the partial voltage V, adjustable on the voltage divider 11, in accordance with the desired feed velocity $v$, of the output of the alternating current generator 8. The second input voltage for the computer R is basically the corrective voltage $f$ controlled by the feeler means F. The output voltages of the computer R will then have the values Δx and Δy according to the formula given hereinabove, and are fed into the driving units Mx and My, respectively, of the guide spindles 10x and 10y, counter-coupled tachometrically in the usual manner.

The corrective voltage $f\alpha$ from the feeler means $F\alpha$ is fed into the rotational drive system of the shaft 2. The tachometer voltage $\dot{\alpha}$ from the tachometer generator $G\alpha$ is not only used for counter-coupling (reverse feedback) to the amplifier $9\alpha$, but is also fed to that one of the input terminals of the computer R, to which also the corrective voltage $f$ is applied. Consequently upon turning of the carrier 3 a corresponding correction of the direction of feed is attained without feeler F' having first to assume a position deviating from the guiding curve or edge.

In order to attain a reduction in the velocity of feed $v$ during turning movements of the shaft 2, i.e. while sensing a templet face comprising a substantial amount of corners and re-entrant angles, the voltage $\dot{\alpha}$ from the tachometer generator $G\alpha$ is rectified in a rectifier arrangement 13 and is fed to the voltage divider 11 through a modulator 12 as an alternating voltage $-V(\alpha)$ of corresponding magnitude acting subtractively.

Curve sensing systems of the kind described permit the sensing of templet faces of any shape desired, even of a closed curve form, at the feed velocity desired, practically without any follow-up error. Of course by the aid of conventional tele-transmission systems the rotational positions of the shafts 2, 10x and 10y may be translated continuously into corresponding controls of the movement of a machine tool, of a cutting torch or of any other device that may be supposed to operate along a path corresponding to the shape of the templet face 50.

It will be understood that each of the elements described above, or two or more together, may also find a useful application in other types of curve sensing system differing from the types described above.

While the invention has been illustrated and described as embodied in electro-mechanical curve sensing system, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In an electro-mechanical sensing system designed to follow a given curve existing in a two-coordinate system determining a system plane, in combination, a carrier movable in two coordinate directions in a plane parallel with said system plane; first and second electrical drive means for moving said carrier in said coordinate directions, respectively; a feeler means assembly supported by said carrier for movement therewith in said two coordinate directions and rotatably connected therewith for turning relatively thereto about an axis perpendicular to said plane; third electrical drive means for imparting a turning motion to said feeler means assembly; said feeler means assembly including first feeler means, adapted to contact a body at an edge thereof which embodies said given curve, and including first voltage control means for controlling said first and second drive means so as to move said carrier in at least one of said coordinate directions for correcting a deviation thereof from said edge whenever said first feeler means indicate such a deviation; said feeler means assembly further including second feeler means adapted to contact said edge adjacent to said first feeler means and including second voltage control means for controlling said third electrical drive means so as to turn said feeler means assembly about said axis an angular amount whenever said second feeler means indicates that the orientation of said feeler means assembly during its movement along said edge requires a turn in said angular amount in order to orient said feeler means assembly corresponding to a change in the curve shape of said edge adjacent to the sensed point where it is in contact with said second feeler means at a given moment; circuit means including a source of electrical energy in circuit with said first, second and third electrical drive means and with said electrical control means for controlling said first, second and third electrical drive means; and trigonometric computer means mounted in operative connection with said feeler means assembly to be capable of reacting to any angular turn thereof and being connected in said circuit means for translating an input voltage from said source and an input voltage modified by said first voltage control means into componental output voltages to be supplied to said first and second electrical drive means, respectively, and being suitable for causing said first and second drive means to move said carrier substantially in the direction of said curve edge at said sensed point as determined at a given moment by said angular turn of said feeler means assembly with respect to said two-coordinate system.

2. An electro-mechanical sensing system as set forth in claim 1 wherein said first and second feeler means include each a sensing feeler pivotally mounted thereon, respectively, each of said sensing feelers having at least one feeler arm adapted to contact said edge with a portion thereof, and another arm for actuating said first and second voltage control means, respectively; resilient means being operatively connected to each of said sensing feelers so as to tend to urge them respectively towards a mean position, in which said portion of said feeler arm of said first feeler means is substantially in alignment with said axis of said feeler means assembly, while said portion of said feeler arm of said second feeler means is in a position immediately adjacent to and parallel with that of said feeler arm of said first feeler means.

3. An electro-mechanical sensing system as set forth in claim 2, wherein circuit means include adjustable control means for adjusting said input voltage to a value V corresponding to a desired feed velocity $v$ of said carrier along said edge; wherein said modified input voltage is adjusted by said first voltage control means to a value $f$ corresponding to a deviation of said first feeler means from said edge in a direction perpendicular thereto at a given moment; and wherein said trigonometric computer means is constructed to translate said voltage values $f$ and V into componental voltages $\Delta x = f \cdot \cos \alpha + V \cdot \sin \alpha$ and $\Delta y = f \cdot \sin \alpha - V \cdot \cos \alpha$, respectively, wherein $\alpha$ is the angle included at the given moment between the tangential direction of said edge at the sensed point and the one of said two coordinates and represented by the orientation of said feeler means assembly and said computer means relative to said one coordinate, said value $\Delta x$ being the voltage supplied to said first electrical drive means for moving said carrier in the direction of said one coordinate, while said value $\Delta y$ is the voltage supplied to said second electrical drive means for moving said carrier means in the direction of the other one of said coordinates.

4. An electro-mechanical sensing system as set forth in claim 3, wherein a tachometer generator means is operatively connected with said feeler means assembly for being operated thereby so as to generate a tachometer voltage corresponding to any turning movement of said feeler assembly; and wherein said circuit means include means for introducing such tachometer voltage additively together with said input voltage modified by said first voltage control means into said computer means whereby any follow-up error of said first feeler means upon rotation of said feeler means assembly is automatically compensated.

5. An electro-mechanical sensing system as set forth in claim 4, voltage reducing means connected with said tachometer generator for being supplied with said tachometer voltage and capable of converting said tachometer voltage into a negative voltage component, said voltage reducing means being connected with said adjustable control means for injecting said negative voltage component into said circuit between said source of electrical energy and said computer means for reducing said input voltage and thereby said speed velocity $v$ to a degree corresponding to the rotary speed of said feeler means when turning about said axis.

6. An electro-mechanical sensing system as set forth in claim 2, wherein said feeler arms of said sensing feelers of said first and said second feeler means, respectively, are mounted for pivoting movement in planes substantially parallel with each other and with said axis.

7. An electro-mechanical sensing system as set forth in claim 2, wherein said feeler arms of said sensing feelers of said first and second feeler means, respectively, are mounted for pivoting movement in planes parallel with said axis, but including a substantial angle with each other.

8. An electro-mechanical sensing system as set forth in claim 2 wherein said sensing feeler of said second feeler means is provided with a pair of feeler arms adapted to contact said edge with a portion thereof, respectively, said pair of feeler arms being arranged to straddle said sensing feeler of said first feeler means for being capable of contacting said edge on opposite sides of the point where said portion of said feeler arm of said first sensing feeler contacts said edge.

References Cited in the file of this patent

UNITED STATES PATENTS

| | | |
|---|---|---|
| 2,470,244 | Fryklund | May 17, 1949 |
| 2,559,575 | Fryklund | July 3, 1951 |
| 2,673,951 | Morel | Mar. 30, 1954 |
| 2,679,622 | Deri | May 25, 1954 |
| 2,766,414 | Jessey et al. | Oct. 9, 1956 |
| 2,851,643 | Limberger | Sept. 9, 1958 |